Sept. 14, 1965   G. W. ELVERUM, JR   3,205,656
VARIABLE THRUST BIPROPELLANT ROCKET ENGINE
Filed Feb. 25, 1963   7 Sheets-Sheet 1

GERARD W. ELVERUM, JR
INVENTOR.

BY
E. Hayward Marshall
AGENT

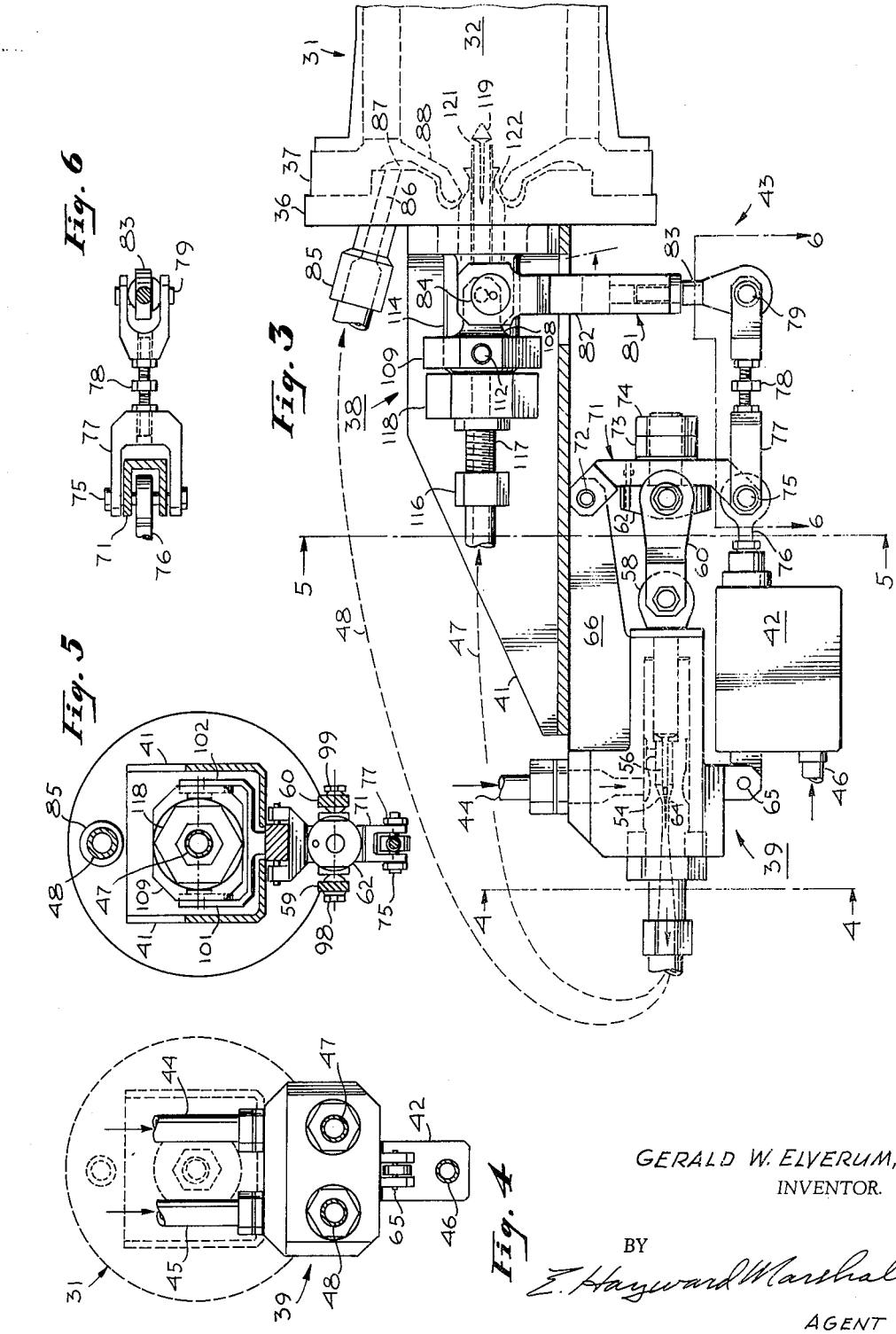

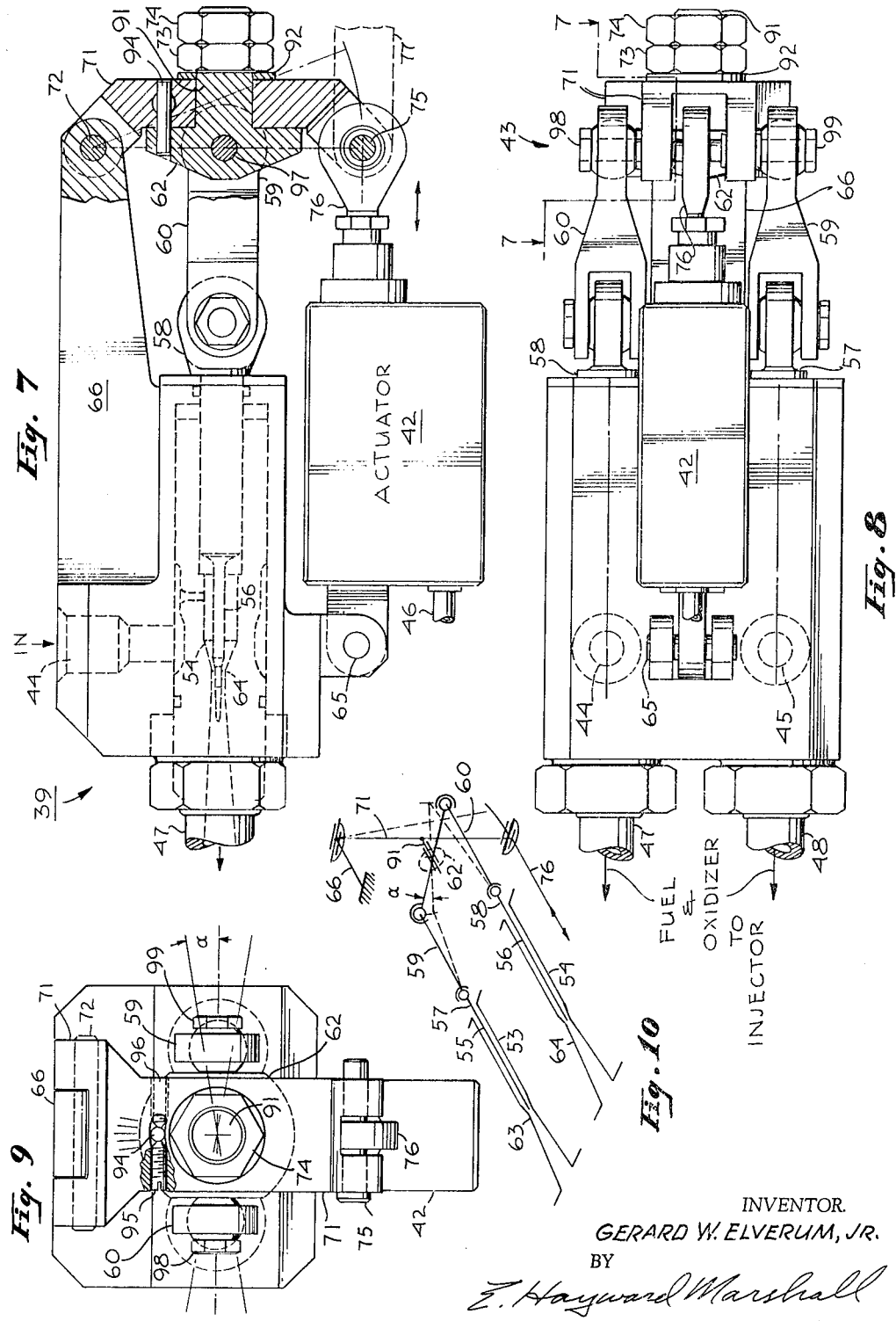

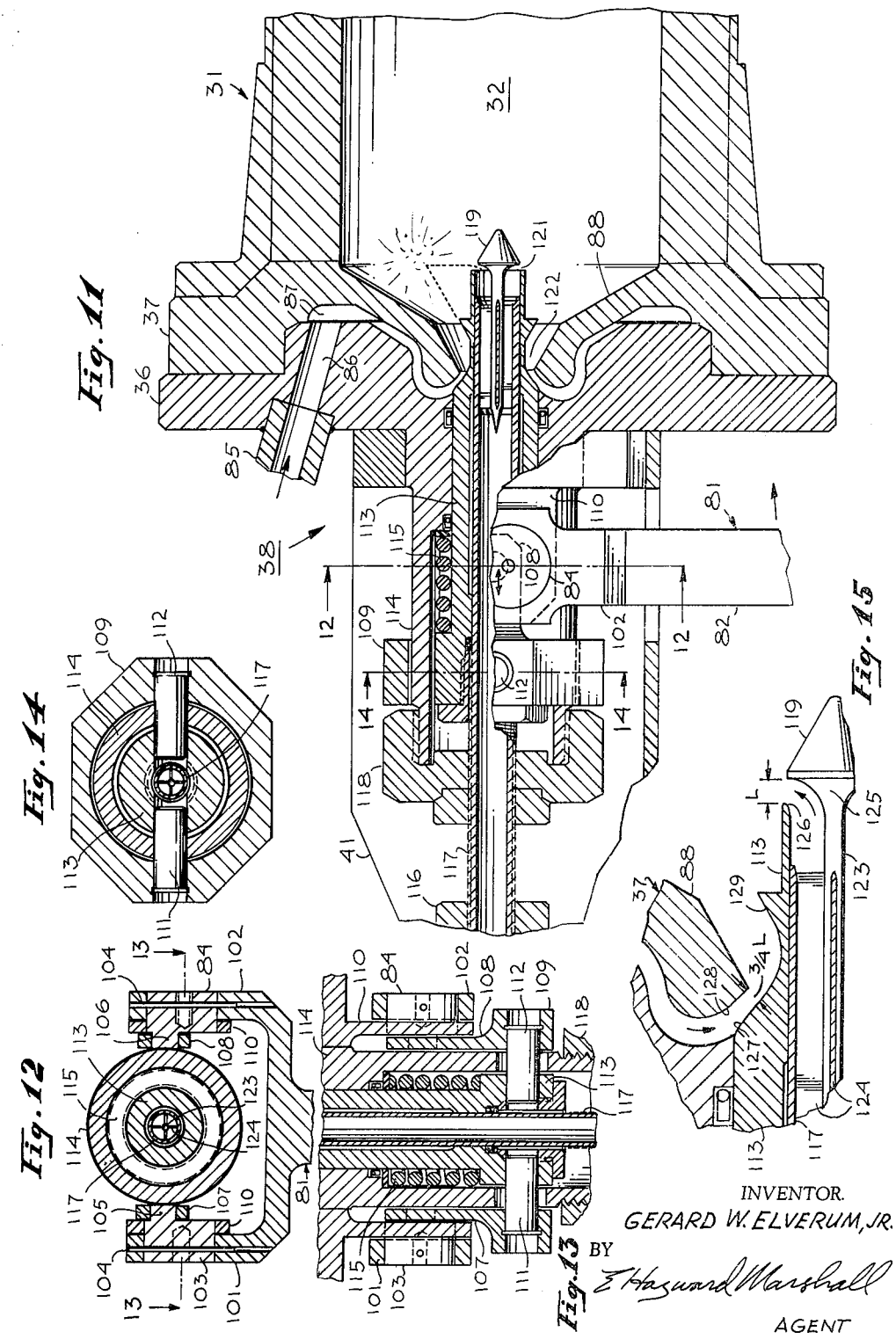

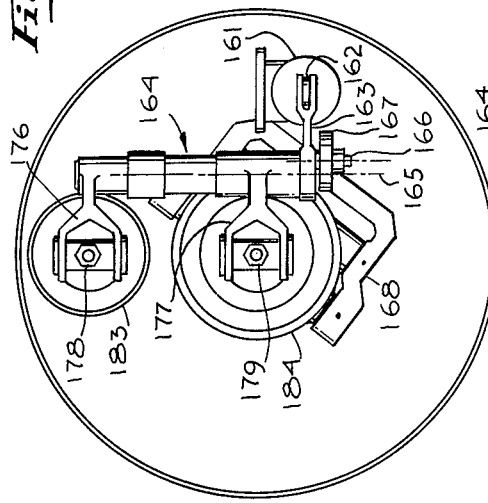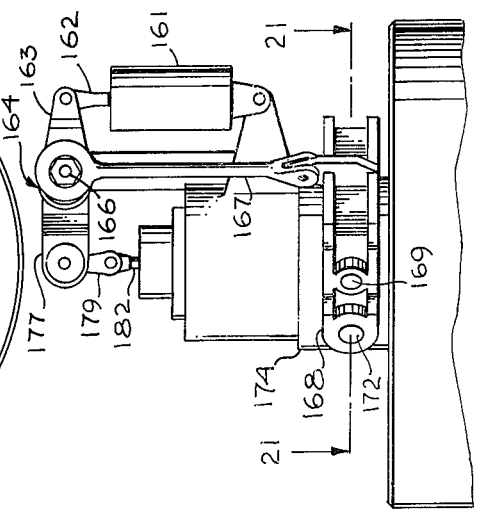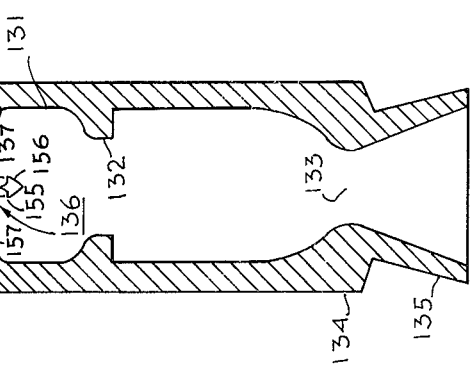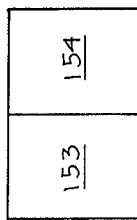

Sept. 14, 1965     G. W. ELVERUM, JR     3,205,656
VARIABLE THRUST BIPROPELLANT ROCKET ENGINE
Filed Feb. 25, 1963                    7 Sheets-Sheet 7
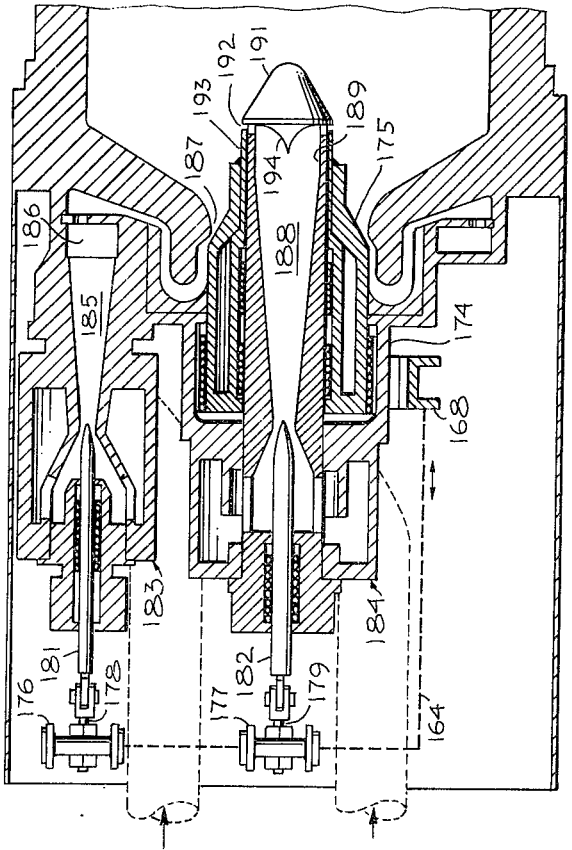
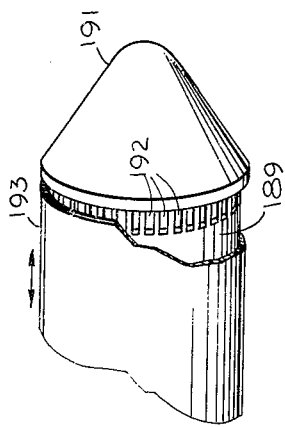
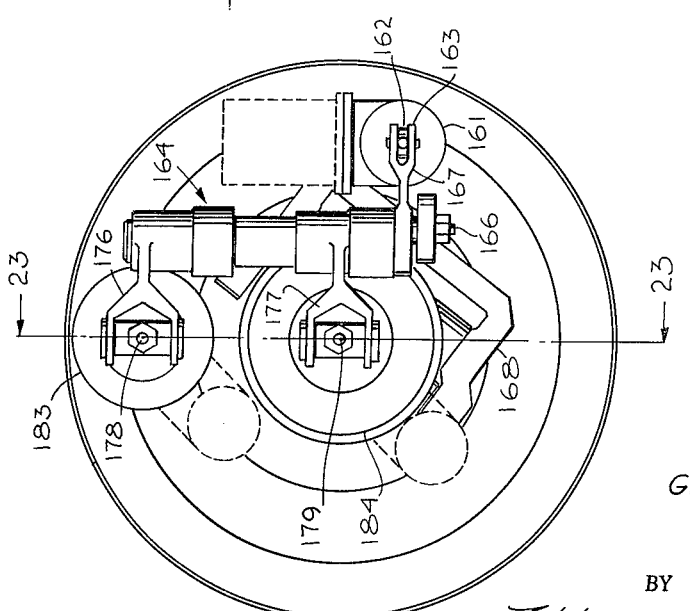
GERARD W. ELVERUM, JR.
INVENTOR.
BY
E. Hayward Marshall
AGENT United States Patent Office 3,205,656
Patented Sept. 14, 1965

3,205,656
VARIABLE THRUST BIPROPELLANT ROCKET ENGINE
Gerard W. Elverum, Jr., Rolling Hills, Calif., assignor, by mesne assignments, to Thompson Ramo Wooldridge Inc., Cleveland, Ohio, a corporation of Ohio
Filed Feb. 25, 1963, Ser. No. 260,610
9 Claims. (Cl. 60—35.6)

This invention relates to a variable thrust, bipropellant rocket engine and more particularly to a bipropellant rocket engine which provides a continuous linear thrust control over a very wide throttle range, while maintaining a high combustion efficiency and a constant, accurate control of the flow rates and mixture ratio of fuel and oxidizer.

Numerous attempts have been made to provide a rocket engine with variable thrust over a wide range, but these engines would operate at a lower combustion efficiency or would vary the mixture ratio, thus leaving propellant residuals, when the thrust was throttled beyond a very limited range.

In some of these engines throttling was accomplished with a fixed area injector and separate flow control valves, which requires the injector to be orificed to provide sufficient pressure drop at the minimum thrust level to insure stable and reasonably efficient combustion. For a wide throttling range, very high injector pressure drops are then required at the maximum thrust level. Since the injector pressure drop varies widely with throttling, it is impossible to maintain optimum combustion efficiency across the entire throttling range, and the requirement fo high tank pressures results in extremely high weights for the propulsion system. Therefore, this mode of throttling is only practical for engines with a limited throttle range.

Another approach to throttling is with a variable area injector which combines the functions of flow metering and mixture ratio control with the propellant injection. This arrangement produces a minimum injector pressure drop at the maximum thrust level, but imposes conflicting requirements on the injector design, since the pressure drops of the fuel and oxidizer across the injector, which are required to control the flow rates, are not the same as the pressure drops required for optimum velocities and velocity ratio to provide high combustion efficiency at the various thrust levels.

Furthermore, the optimum pressure drop for the fuel is not equal to the optimum pressure drop for the oxidizer, and, therefore, the fuel and oxidizer tank pressures must be different, thus complicating the system. The flow rates of the fuel and oxidizer are also subject to individual variations created by the thermal distortion of the control orifices in the injector, and by fluctuations in the local pressures in the combustion chamber near the injector, because of the proximity of the flow control orifices to the combustion zone. It is thus impossible to accurately maintain the required mixture ratio during throttling, and the combustion efficiency is substantially lower at the high or low end of the thrust range.

The present invention overcomes the disadvantages of the previous variable thrust rocket engines by providing an injector with adjustable orifice areas for the fuel and oxidizer and separate propellant flow control valves, which are physically separated and hydraulically decoupled from the injector, so that the propellant flow rates are insensitive to variations in down-stream pressure adjacent to the injector orifices. Thus a wide throttling range can be obtained without excessive propellant feed pressures and the flow control and injection functions may be independently optimized without effecting each other.

Briefly stated, one preferred embodiment of the variable thrust bipropellant rocket engine of the present invention consists essentially of a pair of cavitating venturi valves for controlling the propellant flow rates and the mixture ratio, and a concentric tube, variable area injector receiving fuel and oxidizer from the venturi valves and injecting these propellants as a diverging conical sheet and an impinging radial fan into the combustion chamber. The two movable pintles in the cavitating venturi valves and the single movable sleeve which controls both the fuel and oxidizer orifices in the injector are preferably linked together and controlled by a single actuator for an optimum correlation between the flow areas for metering and injection during throttling. If desired, suitable mechanisms and controls may be provided for varying the mixture ratio in accordance with temperature variations of the propellants and/or propellant utilization, either manually or automatically.

One particular arrangement for mixture ratio control is disclosed and claimed in the copending application of Johannes R. Smirra, Serial No. 257,515, filed February 11, 1963, for an Actuator for Differential Positioning of Two Flow Control Valves.

One Object of the present invention is to provide a linear control of thrust in a high performance rocket engine with a high combustion efficiency and accurate mixture ratio control, while continuously varying the thrust level over a wide throttling range.

Another object of the present invention is to provide a variable thrust bipropellant rocket engine having separate variable area flow metering and adjustable orifice injection, which are physically and hydraulically seperated, so that the propellant flow control and propellant injection functions may be individually optimized without effecting each other.

Another object of the present invention is to provide improved means for accurate flow and mixture ratio control of propellants to a rocket engine, which is hydraulically decoupled from the injection function, and wherein the mixture ratio may be adjusted to compensate for temperature, density and other variations in propellant utilization, either manually or automatically.

A further object of the present invention is to provide an improved variable area injector for a variable thrust bipropellant rocket engine having coaxial injector orifices with a single movable control element which assures uniform, circumferential, mixture ratio distribution and uniform flame temperature within the combustion chamber, and also minimizes asymmetrical chamber and nozzle ablation by removing the circular impingment zone of the propellants from the vicinity of the injector and optimizing the absolute oxidizer and fuel injection velocities, as well as the velocity ratio, over the entire throttling range.

Other objects and many of the attendant advantages of this invention will be readily appreciated as the same becomes better understood by reference to the following detailed description when considered in connection with the accompanying drawings wherein:

FIG. 3 is an elevational view on an enlarged scale with portions in section showing the control valves and injector assembly in more detail;

FIG. 4 is an end view of the control valves and actuator taken on the line 4—4 of FIG. 3;

FIG. 5 is a sectional view taken on the line 5—5 of FIG. 3;

FIG. 6 is a partial sectional view taken on the line 6—6 of FIG. 3;

FIG. 7 is a side view on an enlarged scale illustrating the cavitating venturi control valve and actuator assembly with the ratio control adjustment shown in section;

FIG. 8 is a bottom view of the control valve assembly of FIG. 7;

FIG. 9 is an end view of the control valve assembly particularly illustrating the ratio control yoke adjustment;

FIG. 10 is a schematic view illustrating the manner in which the mixture ratio is varied;

FIG. 11 is a partial sectional view on a further enlarged scale illustrating the injector assembly in more detail;

FIG. 12 is a sectional view taken on the line 12—12 of FIG. 11;

FIG. 13 is a sectional view taken on the line 13—13 of FIG. 12;

FIG. 14 is a sectional view taken on the line 14—14 of FIG. 11;

FIG. 15 is a still further enlarged partial sectional view of the orifice portion of the injector illustrating the manner in which the single sleeve simultaneously changes the fuel and oxidizer orifices;

FIG. 18 is a schematic view with portions shown in longitudinal section and illustrating a different arrangement of the cavitating venturi flow control valves and mixture ratio control adjustment, wherein one of the venturi valves is incorporated in the injector assembly;

FIG. 19 is a side view illustrating another modification of the control valve and injector assembly with a fixed mixture ratio;

FIG. 20 is an end view of the assembly shown in FIG. 18;

FIG. 21 is a sectional view taken on the line 20—20 of FIG. 18;

FIG. 22 is an end view on an enlarged scale similar to FIG. 19, but showing further details;

FIG. 23 is a longitudinal sectional view taken on the line 22—22 of FIG. 21; and FIG. 24 is an enlarged fragmentary view of the injector in FIG. 22 with portions broken away and illustrating the configuration of this modification of the injector nose and the radial orifices therein.

Figure 1:
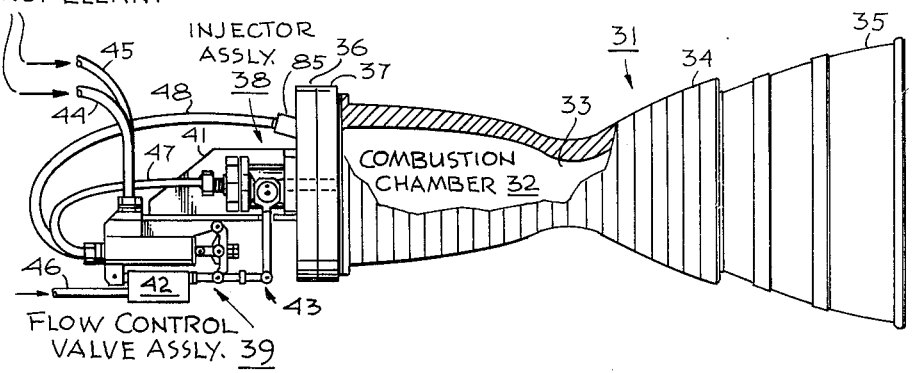
FIG. 1 is an elevational view illustrating one preferred embodiment of the present invention with a portion of the combustion chamber broken away.

Referring now to the drawings in detail and more particularly to FIG. 1, one preferred embodiment of the variable thrust, bipropellant rocket engine of the present invention is illustrated, wherein the jet nozzle 31 consists of a combustion chamber 32 communicating with the throat 33 and expanding outwardly in the expansion portion 34 to which a skirt 35 is attached for the further expansion of the combustion gases.

Figure 2:
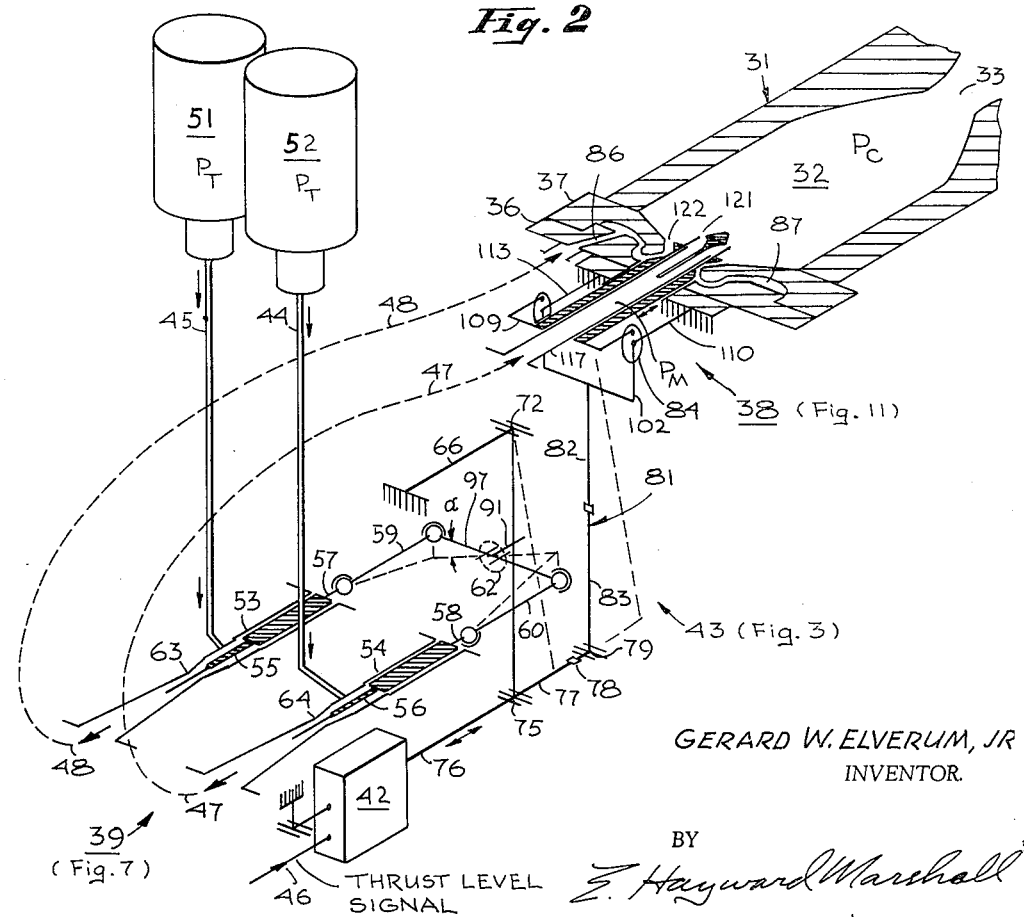
FIG. 2 is a pictorial view of the rocket engine of FIG. 1 with portions broken away and shown in section to illustrate the cooperative relationship and linkage between the cavitating venturi flow control valves and the injector.

The inner walls of the combustion chamber 32, throat 33 and the expansion portion 34 are preferably formed of an ablative material and the skirt 35 may be formed of some thin temperature resistant material in accordance with conventional practice in rocket engine design. Mounting plate 36 is rigidly secured to an annular flange 37 formed on the combustion chamber 32 and serves to mount the injector assembly 38 which extends into the combustion chamber 32 as illustrated in FIGS. 2 and 3.

A flow control valve assembly 39 is mounted on a bracket 41 extending from the injector assembly 38.

An actuator 42 operates a lever mechanism 43 for simultaneous actuation of the control valves and injector in a manner which will be described in more detail infra.

The two propellants flow into the control valve assembly 39 through the lines 44 and 45 extending from shut-off valves (not shown). Another line 46 extends into the actuator 42 from a servo control system (not shown) for varying the thrust of the bipropellant rocket engine. The fuel and oxidizer from the control valve assembly 39 pass through the lines 47 and 48 to the fuel inlet in the injector assembly 38 and the oxidizer inlet in mounting plate 36 respectively.

Referring more particularly to FIGS. 2, 3 and 4, and the sectional views of FIGS. 5 and 6, the propellant tanks 51 and 52 for the oxidizer and fuel respectively are indicated schematically as connected through the lines 44 and 45 to the intake openings which communicate with the converging intake sections of the cavitating venturi valves 53 and 54 respectively. The venturi valves 53 and 54 are each provided with contoured pintles 55 and 56 which may be integrally formed or rigidly connected at their outer ends to push rods 57 and 58 which in turn are pivotally connected to the links 59 and 60 pivoted on the ratio control disc 62. The inner contoured ends of the pintles 55 and 56 extend into the throats 63 and 64 of the venturi valves 53 and 54 and are axially movable to vary the throat area in a linear manner, that is, the contour of the pintles is preferably parabolic, so that the change in area of the throat is directly proportional to the lienar axial movement of the pintle. The diverging outlet sections of venturi valves 53 and 54 are connected to lines 47 and 48.

The actuator 42 is pivotally connected at its forward end to the control valve assembly 39 by pivot pin 65. The control valve assembly 39 is provided with a support arm 66 which is secured to the bracket 41 rigidly mounted on the mounting plate 36 for supporting the control valve assembly 39 in its proper position.

The ratio control disc 62 is swiveled or rotatably mounted on a lever arm 71 which is pivoted at 72 on the support arm 66 extending from control valve assembly 39. Ratio control disc 62 may be secured in any adjusted position by the lock nuts 73 and 74, or the lock nuts may be set to permit manual or automatic adjustment. Further details of construction and the operation of the ratio control disc for varying the mixture ratio of the oxidizer and fuel will be described in more detail in conjunction with FIGS. 7–10.

The lower end of the lever 71 is pivotally connected at 75 to the push rod 76 extending from actuator 42 and to the adjustable link or connecting rod 77 which is provided with a screw adjustment 78 for varying the length thereof. The opposite end of link 77 is pivoted at 79 to an adjustable lever arm 81 which consists of two parts, an upper part 82 and a lower part 83 which is threaded into the upper part 82 for varying the length of the lever arm 81. The upper end of the lever arm 81 is tightly mounted (for example by a shrink fit) on a rotary eccentric disc 84 free to rotate about its center which is slightly below the longitudinal axis of the injector assembly 38.

The lever mechanism 43, as shown in FIGS. 1, 2 and 3, is manually adjustable to provide flexibility for the optimization of the mixture ratio, the ratio or rate of change of injector orifice area to the rate of change of the venturi valve throat areas and the zero position of all elements for any particular combination of propellants and for any specific mode of operation. However, it will be apparent that many of these adjustments may be eliminated for any particular mission.

The detailed construction of the injector mechanism which is operated through the adjustable lever arm 81 and disc 84 will be described in more detail in conjunction with FIGS. 11–15. The oxidizer line 48 is connected to a fitting 85 which connects through an opening 86 to an annular passage 87 formed between the mounting plate 36 and the face plate 88 and extending back through the mounting plate to one of the injector orifices.

Referring now to the enlarged detailed views of FIGS. 7, 8 and 9, the mixture ratio control mechanism is more clearly illustrated. The control disc 62, lever arm 71 and a portion of the support arm 72 is broken away and shown in section to illustrate one form of mixture ratio adjustment, which is disclosed and claimed in the copending application noted supra. The control disc 62 is rotatably mounted on a stub shaft 91 which extends through the lever arm 71 forming a bearing therefor, and the outer end of stub shaft 91 is threaded to receive the lock nuts 73 and 74, as well as a washer 92 seated between the lock nut 73 and lever 71.

An arcuate slot 93 as shown in FIG. 9 receives a pin 94 extending from the control disc 62. The pin 94 is positioned in the arcuate slot 93 by a pair of set screws 95 and 96 in a threaded bore intersection the slot at right angles to the pin 94. Obviously the set screws 95 and 96 may be replaced by any other suitable actuating mechanism (not shown) for automatically adjusting the mixture ratio in accordance with the temperature of the propellants, propellant utilization, a remote manual control or any other desired control function.

The pin 97 extending transversely through the control disc 62 has a pair of nuts 98 and 99 threaded on its outer ends for retaining the links 59 and 60 for actuating the push rods 57 and 58 and positioning the pintles 55 and 56 with respect to the throats 63 and 64 of the cavitating venturi valves 53 and 54.

It will be quite apparent from a careful consideration of the schematic view of FIG. 10 that by rotation of the control disc 62 in a counter-clockwise direction, as seen in FIGS. 3 and 10, the length of the lever arm about the pivot 72 will be increased for the link 59 and decreased for the link 60, as the lever arm 71 is moved by the actuator 42 through push rod 76. In this position after rotation through the angle α in a counter-clockwise direction it will be apparent that the linear movement of push rod 57 and pintle 58 will be proportionately larger than the corresponding movement of push rod 58 and pintle 56. With the particular arrangement shown in FIGS. 2–10, this will increase the ratio of oxidizer to fuel. Alternatively, movement of the ratio control disc 62 in a clockwise direction will increase the ratio of fuel to oxidizer.

The enlarged views of FIGS. 11–15 illustrate the injector mechanism in more detail. The upper part 82 of lever arm 81 is bifurcated at its upper end, as shown in FIG. 12, to provide a yoke with two arms 101 and 102 which tightly engage the rotary eccentric discs 84 and 103, and may be secured by staking pins 104. The discs 84 and 103 are rotatably mounted in the arms 110 of a bracket secured to mounting plate 36, and pivot about a center, which is slightly below the longitudinal axis of the injector assembly 38. Discs 84 and 103 have eccentric pins 105 and 106 extending inwardly and engaging the arms 107 and 108 extending from a collar 109.

Collar 109 has a pair of pins 111 and 112 which are shown in FIGS. 11, 13 and 14 and extend inwardly through slots in the injector housing 114 to engage a slidable orifice control sleeve 113 which is axially adjustable within the injector housing 114 to vary both the oxidizer and fuel orifices simultaneously. A spring 115 is positioned between housing 114 and sleeve 113 to urge the control sleeve 113 and lever mechanism 43 toward the full open position.

The fuel line 47 is adapted to be connected to a threaded fitting 116 mounted on one end of an inner sleeve 117, which extends axially through the injector assembly, being rigidly mounted and connected to the injector housing 114 at its outer end by packing nut assembly 118. The other end of the inner sleeve 117 mounts the nose 119 of the injector extending into the combustion chamber 32.

It will be apparent that rotational movement of the lever arm 81 will cause the orifice control sleeve 113 to move axially within the housing 114, thus varying the area of the fuel orifice 121 and the oxidizer orifice 122, which are shown on a much enlarged scale in FIG. 15.

Referring to the detailed view of FIG. 15, the nose 119 of the injector is provided with a central stem 123 which is rigidly connected to the inner sleeve 117 by suitable radial webs 124 and has a curved surface indicated by the numeral 125 for directing the fuel outwardly in a radial fan. The edge 126 of the control sleeve 113 adjacent to the nose 119 of the injector controls the area of the fuel orifice. The converging frusto-conical surface 127 of the control sleeve 126 in conjunction with the frusto-conical surface 128 on the face plate 88 controls the area of the oxidizer orifice. In this particular embodiment the control sleeve 113 is preferably provided with a diverging frusto-conical ramp section 129 which directs the oxidizer outwardly in a conical sheet which intersects the radial fuel fan in an impingement circle, where the fuel and oxidizer are intermixed and the chemical reaction is initiated.

It will be apparent that the particular angle of divergence of the oxidizer conical spray pattern may be varied by varying the inclination of the deflecting frusto-conical ramp portion 129, and that the curved deflecting surface 125 on the nose 119 may be varied to provide a conical spray pattern of the fuel extending either forwardly or rearwardly, as desired, to vary the radius and the location of the impingment circle within the combustion chamber 32, depending on the particular characteristics of the propellants and the size and shape of the combustion chamber.

It will also be apparent that the inclination of the surfaces 127 and 128 may be varied to control the ratio between the oxidizer and the fuel orifice areas for any longitudinal movement of the control sleeve 113. In the particular arrangement shown in FIG. 15, for an axial movement of the control sleeve 113 which provides a linear dimension "L" of the fuel orifice, a corresponding change of "¾L" will occur across the oxidizer orifice perpendicular to the surfaces 127 and 128. However, since the radius of the oxidizer orifice is somewhat larger than the radius of the fuel orifice, this will provide a substantially equal change in the oxidizer orifice for any change in the fuel orifice resulting from any given movement or adjustment of the control sleeve 113. However, this ratio can be readily varied by changing the angels of the surfaces 127 and 128 with respect to the longitudinal axis of the injector or by changing the angles on the edge 126 and the curved surface 125. These various factors may be varied to optimize the velocities and velocity ratio for any particular combination of propellants.

Figure 16:
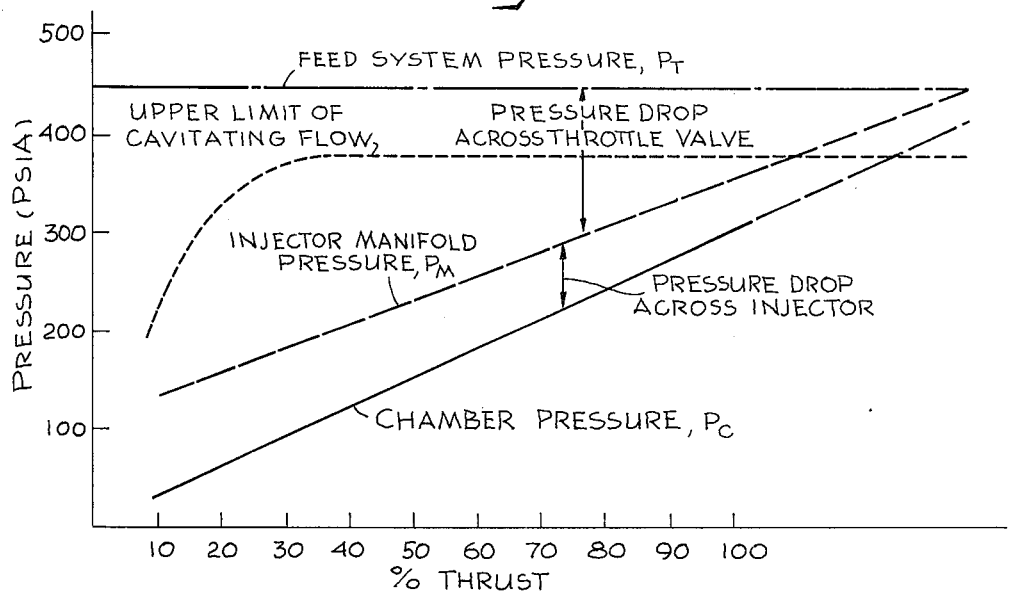
FIG. 16 is a diagram illustrating the operating characteristics of the variable area injector with separate cavitating venturi flow valves as illustrated in FIGS. 1–14.

The operating characteristics of a variable area injector with separate, cavitating venturi, flow control valves are shown in FIG. 16. The injector orifice areas may be adjusted to any eslected set of injector design criteria without effecting mixture ratio, provided only that the resulting manifold pressure falls within the limits required for cavitating flow of the venturi valve. The individual fuel and oxidizer manifold pressures may differ considerably, but flow rates and mixture ratio remain uneffected by the propellant manifold pressure $P_M$. It should be noted that the fuel and oxidizer tanks can be operated from a common regulated pressure, even though the injector pressure drop ratios are greatly different from unity. A common tank pressure system will improve the overall propellant utilization by eliminating one variable from the system.

In FIG. 16 the feed system pressure $P_T$ has been indicated at a nominal pressure of 450 p.s.i. absolute, but may vary depending on the particular system requirements. The upper limit of cavitating flow which would occur in the cavitating venturi valves 53 and 54 has been indicated as crossing the injector manifold pressure line $P_M$ and the chamber pressure line $P_C$ for thrust greater than 100%.

While the bipropellant rocket engine of the present invention is preferably operated in a thrust range as indicated in FIG. 16 between 10% and 100% thrust, wherein the venturi valves 53 and 54 are always operating with a cavitating flow, it is possible to operate at a higher thrust level, where the venturi valves do not cavitate, in order to obtain a maximum thrust with a minimum tank pressure. This type of operation can be utilized, particularly where it is not necessary to operate at varying thrust levels in the non-cavitating region, but the thrust would be reduced rapidly from the maximum to a lower thrust within the cavitating region and then varied within this cavitating range.

For optimum performance it has been determined experimentally, that the pressure drop across either one of the injector orifices should be held relatively constant across the throttling range; that is, the manifold pressure line $P_M$ should lie generally parallel to the chamber pressure line $P_C$ as shown in FIG. 16. However, it will be apparent that there can be either a convergence (as shown) or divergence of these two lines in the direction of maximum thrust if required for optimum performance. This consistency of pressure drop is possible only with the combination of the variable area injector and the separate, cavitating venturi flow control valves of the present invention. Other throttling concepts must employ whatever injector pressure drops are required for flow control.

Figure 17:
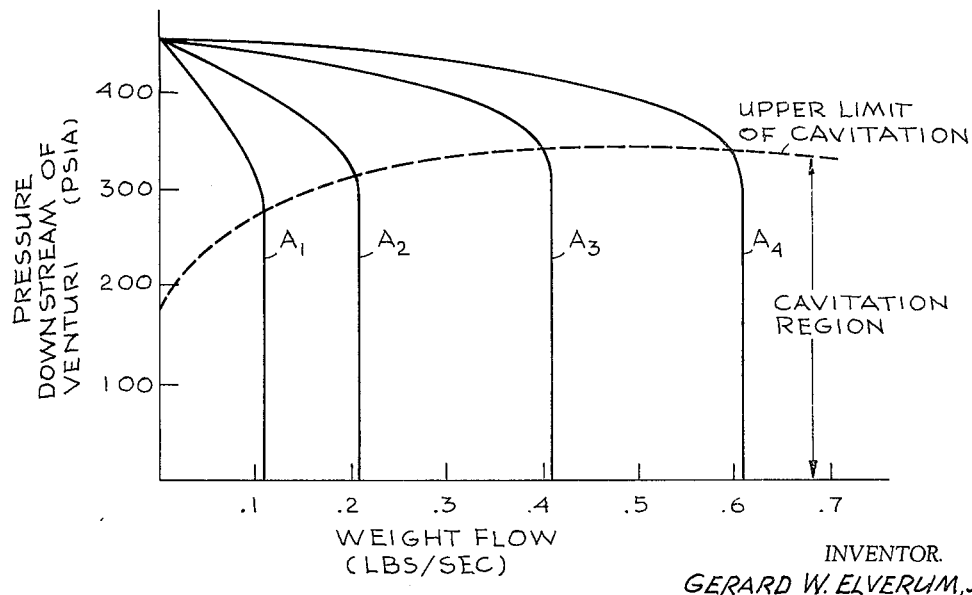
FIG. 17 is a flow chart illustrating the constant flow characteristics of a cavitating venturi valve for different throat areas, whereby a constant flow rate is obtained in the cavitating region for any throat area regardless of down-stream pressure.

The flow chart of FIG. 17 illustrates the weight of propellant flow in pounds per second plotted against the pressure downstream from the venturi and also indicates the upper limit of cavitating flow. It will be apparent that for any given venturi throat area $A_1$, $A_2$, $A_3$ or $A_4$ the flow in the cavitating region is subtsantially constant, whereas the flow in the non-cavitating region varies considerably with the downstream pressure.

Under highly throttled conditions, for example, with a throat area $A_1$, the critical pressure drop across the venturi valve required for cavitating is increased somewhat. However, this characteristic is actually an advantage for the variable thrust rocket engine of the present invention, since it limits the volume of the cavitation zone as the injector manifold pressure falls to very low values, thus limiting to low values the local injection pressure disturbances resulting from dynamic variations in the cavitation bubble.

It will be apparent that the cavitating venturi valves of the present invention have the unique capability of hydraulically decoupling the flow control function from the injector function, so that each function may be optimized without compromising the other. The propellant flow rates and therefore the mixture ratio are insensitive to variations in downstream pressure resulting from changes in the injector orifice area or from chamber pressure fluctuations.

A cavitating venturi valve makes use of the fact that as liquid flow through a venturi throat is increased by decreasing the pressure downstream of the throat, a point will be reached at which no further flow increase will be experienced, irrespective of how much further the downstream pressure is depressed. The reason for this characteristic is that as the upstream pressure head is increasingly converted to fluid velocity the throat static pressure finally reaches the vapor pressure of the liquid. At this point the liquid changes phase, and further lowering of the downstream pressure merely creates additional cavitation at the throat, with the liquid flow rate remaining constant.

In a venturi with a well designed diffusing section downstream of the throat, cavitation will occur when the downstream pressure is about 85 percent of the upstream pressure. Therefore, as long as the injector manifold pressure is less than this value, the propellant flow rate to the engine will be a function only of the tank pressure and the venturi throat area. As a matter of fact, any throttling valve will eventually display this flow limiting characteristic if it is required to operate over a sufficiently broad range. The point at which this abrupt change in flow characteristic will occur, however, is usually non-reproducible. It would be extremely difficult, therefore, to maintain a constant propellant flow rate ratio over a broad range with a pair of ordinary throttle valves. For this reason, the use of a control valve which operates in the cavitating region substantially throughout its throttling range is an important aspect of this invention.

The cavitating venturi valves 53 and 54 preferably have parabolically contoured pintles 55 and 56, which give a linear relationship between pintle stroke and flow. The relative movement of these pintles 55 and 56 may be precisely adjusted by the adjustment of ratio control disc 62 for providing a constant mixture ratio throughout the throttle range. Thrust level is regulated by movement of the actuator 42 and push rod 76 through the lever mechanism 48, which not only adjusts the axial position of the valve pintles 55 and 56, but also fixes the orifice areas in the variable area injector 38 to give maximum performance.

The cavitating venturi valve enhances stable combustion because of its characteristic insensitivity to downstream pressure. The propellant flow rate cannot be increased above the flow set by the valve, regardless of any changes in chamber pressure, as long as the upstream supply pressure is constant. Therefore, the fuel required to support engine pressure surges is not available, thus resulting in stable engine operation under all operating conditions.

In a bipropellant injector the propellants must be injected so that the local mixture ratio throughout the chamber is constant at the desired value. Any local deviations from the desired mixture ratio results in some degradation of the performance. These local deviations can also result in asymmetrical erosion of ablative chambers. The mixture ratio distribution in the chamber is essentially controlled by the distribution of propellants leaving the liquid mixing zone just prior to spray formation.

In certain injectors and with certain highly reactive propellants, only a limited amount of liquid phase mixing can take place before sufficient quantities of gas and vapor are generated to cause both the oxidizer and fuel to be flown in opposite directions, so that some of the propellants will remain unmixed. These reactions can also cause pressure fluctuations in the impingement zone which are so violent that they may seriously disturb the propellant flows and prevent stable combustion conditions.

In the injector of the present invention the impingement zone is removed from the points of injection of the propellants and the face of the injector, so that fluctuations in local pressure within the impingement zone cannot disturb the propellant flows. Furthermore, the oxidizer is sprayed out in a conical fan so that the radial fuel fan can penetrate into the oxidizer spray in the impingement zone or circle, thus forming a uniform spatial mixture of the propellants prior to the rapid liquid phase reactions. For given propellant densities, overall mixture ratio and injector geometry, there is a narrow range of propellant injection velocities ratio which will result in maximum mixture ratio uniformity throughout the resultant spray. The liquid phase reactions now generate gas and vapor which atomizes and distributes the remaining liquid oxidizer and fuel uniformly in all directions resulting in high combustion efficiency.

The symmetry of mass distribution obtained by the coaxial injector of the present invention also provides a uniform circumferential heat load to ablative thrust chamber walls to insure even throat ablation and char depth of the chamber walls.

The cone angle of the oxidizer sheet, the axial location and the radius of the impingement circle, and the ratio and absolute value of the propellant stream velocity are all important in obtaining high combustion efficiency and uniform circumferential heat loads in the combustion chamber and throat of the engine.

One particular advantage of the injector element of the present invention is that its geometry is readily adjustable for performance optimization. The physical intermeshing of fuel and oxidizer particles at the impingement circle just prior to surface reaction can be widely adjusted by a large variety of combinations of oxidizer and fuel cone angles, radius and axial location of the impingement circle, and the ratio and absolute values of the propellant sheet velocities. Thus the injector may be optimized for various combinations of propellants, and is capable of providing highly efficient combustion at various thrust levels over a wide range.

The optimum velocity ratio for the $N_2OH$ and $N_2H_4$ propellant combination lies between 1.0 and 1.1, whereas the optimum velocity ratio for $N_2OH$ with 50/50 $N_2H_4$ and unsymmetrical dimethyl hydrazine is approximately 1.4. The optimum velocities and velocity ratio for other propellant combinations may vary considerably.

While the rocket engine of the present invention is primarily intended for missions requiring a variable thrust over a wide range, it is quite apparent that some of the advantages of the present invention may be realized in a rocket engine for constant thrust with fixed area bipropellant control valves or orifices and a fixed area injector similar to those disclosed herein. For a limited range of thrust variation the area of either the control valves or injector orifices only may be variable.

One modification of the present invention is disclosed in the schematic view of FIG. 18 with the combustion chamber, the injector and the flow control valves shown in section. In this modification the cavitating venturi flow control valves are close coupled with one control valve being incorporated in the inner sleeve of the injector and the other control valve being connected directly to the inlet to the annular passage or manifold leading to the other injector orifice. This modification also illustrates a different type and arrangement of the actuator, lever mechanism and mixture ratio control adjustment.

In this embodiment the rocket engine is preferably provided with an ablative thrust chamber 131 having an internal annular ring 132 to cause turbulence and better mixing and combustion of the propellants, and leading into a throat area 133 in a nozzle 134 with an expansion skirt 135.

The injector assembly 136 is axially mounted extending into the combustion chamber 131 and is similar in construction to the injector illustrated on a larger scale in FIGS. 23 and 24.

The injector assembly 136 includes a movable control sleeve 137 which is actuated through the link 138 by the lever 139.

The lever 139 is part of a lever mechanism 141 which is actuated by the servo-valve and actuator 142 which moves the lever 139 about a movable fulcrum 143. The position of the fulcrum 143 may be varied by movement of a servo-controlled actuator 144 to provide a mixture ratio control adjustment which varies the relative movement of the pintles 145 and 146 to control the flow of fuel and oxidizer through the cavitating venturi flow control valves 147 and 148, the propellants coming through the lines 151 and 152 from the propellant tanks 153 and 154.

The venturi control valve 147 is incorporated in the injector assembly 136 and forms the inner sleeve which is coaxial with the movable control sleeve 137 which simultaneously controls the inner fuel orifices 155 adjacent to the nose 156, and the concentric outer oxidizer orifice 157 communicating with annular passage 158 and venturi control valve 148. The details of this construction will be described more completely in conjunction with FIGS. 23 and 24, showing a similar arrangement.

It will be apparent that movement of the fulcrum 143 to the right by the actuator 144 will increase the percentage of oxidizer with respect to the percentage of fuel by making the movement of pintle 146 greater with respect to the movement of pintle 145 about the fulcrum 143. Obviously movement of the fulcrum 143 in the opposite direction will increase the percentage of fuel with respect to the percentage of oxidizer.

The cavitating venturi flow control valves 147 and 148 in conjunction with the coaxial injector assembly 136 will function in a manner similar to that described in conjunction with FIGS. 1–17 above.

A further modification of the present invention is illustrated in FIGS. 19–24, wherein a somewhat simplified lever mechanism is illustrated having no adjustment of the lever arms and links and no mixture ratio control adjustment, since these adjustments may not be necessary when a combination of propellants are utilized, such as inhibited red fuming nitric acid as an oxidizer and unsymmetrical dimethyl hydrazine as the fuel, where the variations of density and vapor pressure with temperature are similar and therefore no temperature control is required.

In this form of the invention an actuator 161 has a push rod 162 which is connected to an arm 163 for actuating the rocker arm assembly 164 rotating about an axis 165.

An eccentric pin 166 on rocker arm assembly 164 moves push rod 167 and thus adjusts the yoke 168 which is pivotally mounted on pins 169 and 171.

As shown in FIGS. 19 and 21, the yoke 168 is provided with a pair of pins 172 and 173 which extend inwardly through slots in the injector housing 174 and engage the control sleeve 175 for axial movement thereof to control the area of the fuel and oxidizer orifices in a manner which will be described subsequently in conjunction with FIGS. 23 and 24.

The rocker arm assembly 164 is also provided with rocker arms 176 and 177 which are connected to the push rods 178 and 179 for controlling the longitudinal movement of the pintles 181 and 182, and thus controlling the flow of propellants through the fuel control valve 183 and oxidizer control valve 184. These control valves are also designed and function as cavitating venturi valves with the throat area controlled by the parabolically contoured inner ends of the pintles 181 and 182.

The downstream section 185 of control valve 183 extends into an annular passage or manifold 186 communicating with the outer fuel orifice 187, having a variable area controlled by movement of the concentric control sleeve 175.

The frusto-conical downstream section 188 of the oxidizer control valve 184 is coaxial with and forms a part of the injector assembly and is integrally formed with a cylindrical sleeve 189.

The sleeve portion 189 in this modification is integrally formed or connected to the nose portion 191 and is provided with a plurality of peripheral slots 192 which form the inner oxidizer orifice and may be completely or partially covered by the inner end 193 of the control sleeve 175 for throttling or varying the total orifice area, or may be completely uncovered for full throttle operation of the engine. The stem 194 having a curved surface is formed on the inside of the nose 191 to deflect the oxidizer by directing the flow in a generally radial direction through the slots 192.

In this particular embodiment it may be desirable with certain propellants to reverse the flow of fuel and oxidizer by connecting the cavitating venturi flow control valve 183 to the oxidizer tank and connecting the cavitating venturi flow control valve 184 to the fuel tank, particularly with certain propellant combinations, such as nitrogen tetroxide and hydrazine fuel.

With this arrangement the penetration of the oxidizer into the fuel is accomplished by means of the slotted sleeve 189 which forms a plurality of radial jets which penetrate the hollow cylinder of fuel which is injected through the outer orifice 187 around the outer periphery of the control sleeve 175. The oxidizer is injected through the slotted sleeve 189 so that the slots 192 form a number of radial filaments or jets which partially penetrate the cylinder of fuel and each of the jets is enfolded by the fuel in such a fashion that no preferential separation of oxidizer and fuel can occur.

For given propellant densities, overall mixture ratio and injector geometry, there is a relatively narrow range of propellant injection velocity ratios which will result in maximum mixture ratio uniformity throughout the resultant mixing zone. The liquid phase reactions when they do occur, now generate gas and vapor which atomize and distribute the remaining liquid oxidizer and fuel uniformly in all directions, thus increasing combustion efficiency. This particular arrangement appears to be more efficient at the high thrust end of the throttle range, where the thicknesses of the sheets of oxidizer and fuel become quite large.

It will be apparent that a conical ramp may be utilized on the control sleeve 175 similar to that shown on the control sleeve 113 at 129 to provide a diverging conical sheet of fuel for intercepting the jets of oxidizer. The orifices 192 may be rectangular in shape as shown or may have other suitable shapes, such as tapered, triangular or curved, and may be inclined at various angles to the axis of the injector. Here again the radius and location of the impingement zone of the fuel and oxidizer may be varied to optimize the distribution and reaction of the propellants to obtain a maximum combustion efficiency and uniform heat load in the combustion chamber.

Obviously, many other modifications and variations of the present invention may be made within the scope of the following claims.

What is claimed is:

1. A variable thrust bipropellant rocket engine comprising:
 (A) a combustion chamber;
 (B) an injector assembly extending into said combustion chamber and including,
  an inner sleeve forming a passage for one propellant and having a peripheral orifice formed at the end thereof within said combustion chamber,
  an orifice control sleeve mounted concentrically with respect to said inner sleeve,
  a second peripheral orifice formed around said control sleeve, and a passage for the other propellant communicating with said second orifice;
 (C) a pair of cavitating venturi control valves,
  each of said valves having a throat and an inlet and an outlet section,
  a pintle mounted for axial movement in each of said control valves and extending into said throat for varying the area thereof,
  means for connecting said inlet section of each of said control valves to a source of propellant under pressure, and
  means for connecting the outlet section of each of said control valves to one of the passages leading to one of said orifices; and
 (D) means for simultaneously actuating both of said pintles.

2. A variable thrust bipropellant rocket engine comprising:
 (A) a combustion chamber;
 (B) an injector assembly extending into said combustion chamber and including,
  an inner sleeve forming a passage for one propellant and having a peripheral orifice formed at the end thereof within said combustion chamber,
  an orifice control sleeve mounted concentrically with respect to said inner sleeve,
  a second peripheral orifice formed around said control sleeve, and a passage for the other propellant communicating with said second orifice,
  said control sleeve being movable axially for simultaneously changing the areas of said orifices;
 (C) a pair of cavitating venturi control valves,
  each of said valves having a throat and an inlet and an outlet section,
  a pintle mounted for axial movement in each of said control valves and extending into said throat for varying the area thereof,
  means for connecting said inlet section of each of said control valves to a source of propellant under pressure, and
  means for connecting the outlet section of each of said control valves to one of the passages leading to one of said orifices; and
 (D) means for simultaneously actuating both of said pintles and said control sleeve to provide optimum injection flow areas at any propellant flow rates.

3. A variable thrust bipropellant rocket engine comprising:
 (A) a combustion chamber;
 (B) an injector assembly extending into said combustion chamber and including,
  an inner sleeve forming a passage for one propellant and having a peripheral orifice formed at the end thereof within said combustion chamber,
  an orifice control sleeve mounted concentrically with respect to said inner sleeve,
  a second peripheral orifice formed around said control sleeve, and
  a passage for the other propellant communicating with said second orifice;
 (C) a pair of cavitating venturi control valves,
  each of said valves having a throat and an inlet and an outlet section,
  a pintle mounted for axial movement in each of said control valves and extending into said throat for varying the area thereof,
  means for connecting said inlet section of each of said control valves to a source of propellant under pressure, and
  means for connecting the outlet section of each of said control valves to one of the passages leading to one of said orfices; and
 (D) means for simultaneously actuating both of said pintles, and means for varying the relative strokes of said pintles for controlling the mixture ratio of the propellants.

4. A variable thrust bipropellant rocket engine comprising:
 (A) a combustion chamber;
 (B) an injector assembly extending into said combustion chamber and including,
  an inner sleeve forming a passage for one propellant and having a peripheral orifice formed at the end thereof within said combustion chamber,
  an orifice control sleeve mounted concentrically with respect to said inner sleeve,
  a second peripheral orifice formed around said control sleeve, and
  a passage for the other propellant communicating with said second orifice,
  said control sleeve being movable axially for simultaneously changing the areas of said orifices;
 (C) a pair of cavitating venturi control valves,
  each of said valves having a throat and an inlet and an outlet section,
  a pintle mounted for axial movement in each of said control valves and extending into said throat for varying the area thereof, means for connecting said inlet section of each said control valves to a source of propellant under pressure, and means for connecting the outlet section of each of said control valves to one of the passages leading to one of said orifices; and (D) means for simultaneously actuating both of said pintles and said control sleeve to provide optimum injection flow areas at any propellant flow rates, and means for varying the relative strokes of said pintles for controlling the mixture ratio of the propellants.

5. A variable thrust bipropellant rocket engine comprising:

(A) a combustion chamber;

(B) an injector assembly extending into said combustion chamber and including, an inner sleeve forming a passage for one propellant and having a peripheral orifice formed at the end thereof within said combustion chamber, an outer concentric control sleeve mounted for slidable movement axially with respect to said inner sleeve, a second peripheral orifice formed around said movable control sleeve, a passage for the other propellant communicating with said second orifice, and said control sleeve being movable axially in one direction for simultaneously increasing the areas of said orifices and in the opposite direction for simultaneously decreasing the areas of said orifices; and (C) a pair of cavitating venturi control valves, each of said valves having a throat and an inlet and an outlet section, a pintle mounted for axial movement in each of said control valves and extending into said throat for varying the area thereof, means for connecting said inlet section of each of said control valves to a source of propellant under pressure, and means for connecting the outlet section of each of said control valves to one of the passages leading to one of said orifices; and (D) means for simultaneously actuating both of said pintles and said control sleeve to provide optimum injection flow areas at any propellant flow rates.

6. A variable thrust bipropellant rocket engine comprising:

(A) a combustion chamber;

(B) an injector assembly extending into said combustion chamber and including, an inner sleeve forming a passage for one propellant and having a peripheral orifice formed at the end thereof within said combustion chamber, an outer concentric control sleeve mounted for slidable movement axially with respect to said inner sleeve, a second peripheral orifice formed around said movable control sleeve, a passage for the other propellant communicating with said second orifice, said control sleeve being movable axially in one direction for simultaneously increasing the areas of said orifices and in the opposite direction for simultaneously decreasing the areas of said orifices, and means for directing the propellants outwardly from said orifices to an impingement and reaction zone radially and axially spaced from said orifices;

(C) a pair of cavitating venturi control valves, each of said valves having a throat and an inlet and an outlet section, a pintle mounted for axial movement in each of said control valves and extending into said throat for varying the area thereof, means for connecting said inlet section of each of said control valves to a source of propellant under pressure, and means for connecting the outlet section of each of said control valves to one of the passages leading to one of said orifices; and (D) means for simultaneously actuating both of said pintles and said control sleeve to provide optimum injection flow areas at any propellant flow rates.

7. A variable thrust bipropellant rocket engine comprising:

(A) a combustion chamber;

(B) an injector assembly extending into said combustion chamber and including, an inner sleeve forming a passage for one propellant and having a peripheral orifice formed at the end thereof within said combustion chamber, an outer concentric control sleeve mounted for slidable movement axially with respect to said inner sleeve, a second peripheral orifice formed around said movable control sleeve, a passage for the other propellant communicating with said second orifice, said control sleeve being movable axially in one direction for simultaneously increasing the areas of said orifices and in the opposite direction for simultaneously decreasing the areas of said orifices, means for directing the propellants outwardly from said orifices to an impingement and reaction zone radially and axially spaced from said orifices, and said directing means including a conical ramp section on said control sleeve and a nose portion with a curved surface at the inner end of said inner sleeve for deflecting the propellants outwardly;

(C) a pair of cavitating venturi control valves, each of said valves having a throat and an inlet and an outlet section, a pintle mounted for axial movement in each of said control valves and extending into said throat for varying the area thereof, means for connecting said inlet section of each of said control valves to a source of propellant under pressure, and means for connecting the outlet section of each of said control valves to one of the passages leading to one of said orifices; and (D) means for simultaneously actuating both of said pintles and said control sleeve to provide optimum injection flow areas at any propellant flow rates.

8. In a variable thrust bipropellant rocket engine having a combustion chamber, an improved injector assembly adapted to extend into the combustion chamber, and comprising:

(A) an injector housing;

(B) an inner sleeve mounted in said housing and forming a passage for one of the propellants and having a peripheral orifice formed at the combustion chamber end thereof;

(C) an outer concentric control sleeve mounted for slidable movement axially with respect to said inner sleeve, a second peripheral orifice formed around said movable control sleeve;

(D) a passage for the other propellant communicating with said second orifice;

(E) said control sleeve being movable axially in one direction for simultaneously increasing the areas of said orifices and in the opposite direction for simultaneously decreasing the areas of said orifices;
(F) means for directing the propellants outwardly from said orifices to an impingement and reaction zone radially and axially spaced from said orifices; and
(G) means mounted on said housing for moving said control sleeve axially for simultaneously varying the areas of said orifices.

9. In a variable thrust bipropellant rocket engine having a combustion chamber, an improved injector assembly adapted to extend into the combustion chamber, and comprising:
(A) an injector housing;
(B) an inner sleeve mounted in said housing and forming a passage for one of the propellants and having a peripheral orifice formed at the combustion chamber end thereof;
(C) an outer concentric control sleeve mounted for slidable movement axially with respect to said inner sleeve, a second peripheral orifice formed around said movable control sleeve;
(D) a passage for the other propellant communicating with said second orifice;
(E) said control sleeve being movable axially in one direction for simultaneously increasing the areas of said orifices and in the opposite direction for simultaneously decreasing the areas of said orifices;
(F) means for directing the propellants outwardly from said orifices to an impingement and reaction zone radially and axially spaced from said orifices;
(G) said directing means including a conical ramp section on said control sleeve and a nose portion with a curved surface at the combustion chamber end of said inner sleeve for deflecting the propellants outwardly; and
(H) means mounted on said housing for moving said control sleeve axially for simultaneously varying the areas of said orifices.

References Cited by the Examiner
UNITED STATES PATENTS

| | | | |
|---|---|---|---|
| 2,398,201 | 4/46 | Young et al. | 60—35.6 |
| 2,555,085 | 5/51 | Goddard | 60—39.46 |
| 2,711,929 | 6/55 | Nielsen | 239—456 |
| 2,780,914 | 2/57 | Ring | 60—35.6 |
| 2,891,570 | 6/59 | Krupp | 251—124 X |
| 3,064,903 | 11/62 | Butler | 60—35.6 X |
| 3,074,231 | 1/63 | Klein | 60—35.6 |
| 3,113,583 | 12/63 | Fox | 137—220 |

OTHER REFERENCES

Jet Propulsion, volume 27, No. 9, September 1957, page 1003.

MARK NEWMAN, *Primary Examiner.*

SAMUEL LEVINE, *Examiner.*